(12) United States Patent
Hecking

(10) Patent No.: US 6,338,789 B1
(45) Date of Patent: Jan. 15, 2002

(54) ELECTRO-PHYSICAL WATER TREATMENT APPARATUS

(75) Inventor: Willi Hecking, Mönchengladbach (DE)

(73) Assignee: Hans Sasserath & Co., KG, Korschenbroich (DE)

( * ) Notice: Subject to any disclaimer, the term of this patent is extended or adjusted under 35 U.S.C. 154(b) by 0 days.

(21) Appl. No.: 09/637,183

(22) Filed: Aug. 11, 2000

(30) Foreign Application Priority Data

Aug. 13, 1999 (DE) .......................................... 199 38 510
Dec. 31, 1999 (DE) .......................................... 199 63 950

(51) Int. Cl.⁷ ................................................ C02F 1/461

(52) U.S. Cl. ........................ 205/742; 204/554; 204/660

(58) Field of Search ........................... 205/742; 204/554, 204/660

(56) References Cited

U.S. PATENT DOCUMENTS 6,203,710 B1 * 3/2001 Woodbridge ................ 204/660

* cited by examiner

Primary Examiner—Arun S. Phasge
(74) Attorney, Agent, or Firm—Mallinckrodt & Mallinckrodt; Robert R. Mallinckrodt

(57) ABSTRACT

The invention relates to an apparatus for treating water by means of an electric field. An anode and a cathode are arranged in a treatment chamber. Seed crystals are deposited on the anode and are stripped therefrom to be carried along with the water, which cause crystallization thereon of carbonates contained in the water. Thereby formation of boiler scale, when the water is heated, is reduced. The water from the treatment chamber is exposed to another electric field in an aftertreatment chamber for a dwell time longer than the dwell time in the treatment chamber. Thereby, the growth of the seed crystals is enhanced. The efficiency of a treatment chamber with aftertreatment is higher than the efficiency of the treatment chamber alone.

17 Claims, 6 Drawing Sheets

B-B

ELECTRO-PHYSICAL WATER TREATMENT APPARATUS

BACKGROUND OF THE INVENTION

The invention relates to an apparatus for treating water by means of an electrical field comprising a treatment chamber and an anode and a cathode mounted therein. When a preferably inhomogeneous electric field is applied between the anode and the cathode, seed crystals of minerals contained in the water are formed on the cathode. These seed crystals are separated from the cathode by separating or stripping means and carried away with the flowing water.

Drinking water contains essential minerals, among others calcium and magnesium carbonates. Such minerals, in total, are called water hardness. On one hand, such minerals are important under health aspects. On the other hand, they may cause malfunction of the drinking water installation, in particular if the water is heated. When the water is heated in a drinking water heater, for example, insoluble lime depositions, also called boiler scale, are formed. This boiler scale is formed on the warm side of the installation. Boiler scale impedes heat transmission. In tubes, the boiler scale, over the years, may result in closure of the tube installation downstream of the drinking water heater.

In order to avoid such depositions of boiler scale, the drinking water has been "softened". This softening process removes the minerals from the drinking water. Such softening can be achieved by ion exchange or reverse osmosis. This avoids the formation of boiler scale. In exchange therefor, however, the quality of the drinking water is reduced by the removal of the minerals, which, for other reasons, are desirable.

Methods of treating drinking water by means of a so-called "electro-physical apparatus are known. Such electro-physical apparatus are to cause the formation of seed crystals in the drinking water. The seed crystals are carried away by the drinking water. The conglomeration of the seed crystals results in the drinking water thus treated causing less deposition in the form of boiler scale, on one hand. On the other hand the minerals in the drinking water are retained.

The treatment by means of electro-physical apparatus is substantially based on the following principle:

Drinking water always contains a certain proportion of carbon dioxide ($CO_2$) dissolved therein. This carbon dioxide forms a reaction equilibrium with the remaining components, calcium hydrogen carbonate ($Ca(HCO_3)_2$) being formed from $CaCO_3$ in accordance with the reaction equation

$$CaCO_3 + H_2O + CO_2 \Leftrightarrow Ca(HCO_3)_2$$

If the water is heated, $CO_2$ will escape from the water and boiler scale will be formed. It is, however, also possible to change purposefully the lime-carbon dioxide equilibrium in the drinking water.

If carbon dioxide is supplied to the water, this will result in shifting the equilibrium to the left in the above equation. Seed crystals of calcium carbonate (lime over-saturation) are formed from the calcium hydrogen carbonate present in the water. Then the subsequently formed calcium carbonate will be deposited predominantly on the once generated seed crystals, i.e. the seed crystals "grow".

This reaction is caused electrolytically in a treatment chamber containing a cathode and an anode. The seed crystals are formed on the cathode. The seed crystals have to be added to the drinking water after they have grown sufficiently. Then carbonate is already present in the form of seed crystals in the drinking water, when the drinking water is heated. There is no need of generating seed crystals anew. Accordingly, the carbonate will be deposited predominantly on the seed crystals carried away in the water rather than on the installation elements.

It has been found that development of seed crystals is improved if the electric field between the cathode and the anode is inhomogeneous.

EP patent application 0,751,096 discloses an apparatus for the electro-physical drinking water treatment by means of an electric field wherein an electric field inhomogeneous in space is generated by an a.c. voltage superimposed to a d.c. voltage.

A further prior art apparatus comprises a special steel brush serving as cathode on which seed crystals are formed. These seed crystals are separated from the cathode by means of a stripper. This stripper is a comb which is passed through the special steel brush an causes deformation of the flexible "bristles".

One problem with the formation of seed crystals in an inhomogeneous electric field is that the dwell time of the water with the seed crystals in the electric field is too short. Though many seed crystals are formed, the crystal growth on the seed crystals is not satisfactory. If the current through the electrodes is increased, in order to improve the crystal growth, this results in increased wear of the electrodes. They have to be replaced in regular intervals. This involves high servicing expenditure.

The problem cannot be solved by connecting a plurality of treatment chambers in series. Quite a few treatment chambers would have to be connected in series. Generating an inhomogeneous electric field requires quite an amount of technological expenditure. Furthermore, saturation will be reached: From a certain number of treatment chambers on, each additional treatment chamber will have no effect on the efficiency of the water treatment.

DISCLOSURE OF THE INVENTION

It is an object of the invention to provide an apparatus for water treatment having increased crystal growth.

To this end, an aftertreatment chamber having at least one cathode and at least one anode is provided. In this aftertreatment chamber, the water is passed through an electric field generated between the cathode and the anode. In this aftertreatment chamber, the water has a longer dwell time than in the treatment chamber.

Crystal growth is improved by such an aftertreatment chamber with increased dwell time of the water. In the aftertreatment chamber, the seed crystals generated in the treatment chamber are exposed to an electric field and, thereby, grow considerably faster. Therefore, the efficiency of a treatment chamber provided with an aftertreatment chamber is higher than the efficiency of a simple treatment chamber.

Preferably, the aftertreatment chamber ensures long dwell time of already existing seed crystals. Against this, the treatment chamber preferably is of a design which ensures the generation of as many seed crystals as possible, the dwell time being of no concern. In accordance with a preferred embodiment of the invention, the cathode has a plurality of pins mounted on a carrier. A perforated disc with holes is provided. The pins of the cathode extend through the holes of the perforated disc. The perforated disc cam be moved over the lengths of the pins. By such an arrangement, a strongly inhomogeneous electric field is generated which ensures the formation of many seed crystals. The seed crystals thus formed on the pins of the cathode are stripped therefrom by the perforated disc. An electric motor may be provided to move the perforated disc.

A plurality of treatment chambers may be provided in parallel and/or in series to permit the apparatus to adapt to water flow rate and efficiency of seed crystal formation.

Preferably, the aftertreatment chamber is arranged around the treatment chamber and communicates with the treatment chamber through apertures in a circumferential partition between the treatment chamber and the aftertreatment chamber. Thereby, the apparatus has small dimensions.

Preferably, the aftertreatment chamber is subdivided by radial partitions into a plurality of partial chambers, each aperture in the circumferential partition opening in a respective one of the partial chambers. The radial partitions may be electrodes for generating the electric field in the aftertreatment chamber. Preferably, the electrodes are graphite rods.

In a preferred embodiment, a plurality of treatment chambers are arranged module-like one on top of the other. Then each treatment chamber communicates with an inlet. The aftertreatment chambers are subdivided in partial chambers such that the partial chambers extend over the whole height of all treatment chambers and, at one end, open into an outlet common to all partial chambers. The direction of flow of the water through the treatment chambers is transverse to the pins of the cathode. This structure offers the advantage that an only small pressure drop occurs, as a plurality of treatment chambers are connected in parallel and are surrounded by a common aftertreatment chamber.

Preferably, the electrodes for generating the electrical field in the aftertreatment chamber are contacted to the outside in the aftertreatment chamber on the side opposite the outlet by means of a spring-urged pin. This offers the advantage that the plumber, when installing or dismantling the apparatus, needs not carry out any electrical contacting but only has to connect the inlet and outlet with the pipe system. The electrical contacts can, together, be connected to the mains through a conventional plug.

When the electrodes have alternately positive and negative polarity, an electric field will be generated in the aftertreatment chamber in a simple way. In order to avoid deposition on the electrodes, the polarity of the electrodes is reversed after selected time intervals.

Trough-shaped cavities provided both in the partition between treatment chamber and aftertreatment chamber and, at corresponding locations in the outer wall of the aftertreatment chamber and extending over the length of the electrodes accommodate the electrodes. This permits easy exchange of the electrodes without having to detach any attachment means. The electrodes are retained in the trough-shaped cavities without dislocation.

An embodiment of the invention is described in greater detail hereinbelow with reference to the accompanying drawings.

DESCRIPTION OF PREFERRED EMBODIMENT OF THE INVENTION

Figure 1:
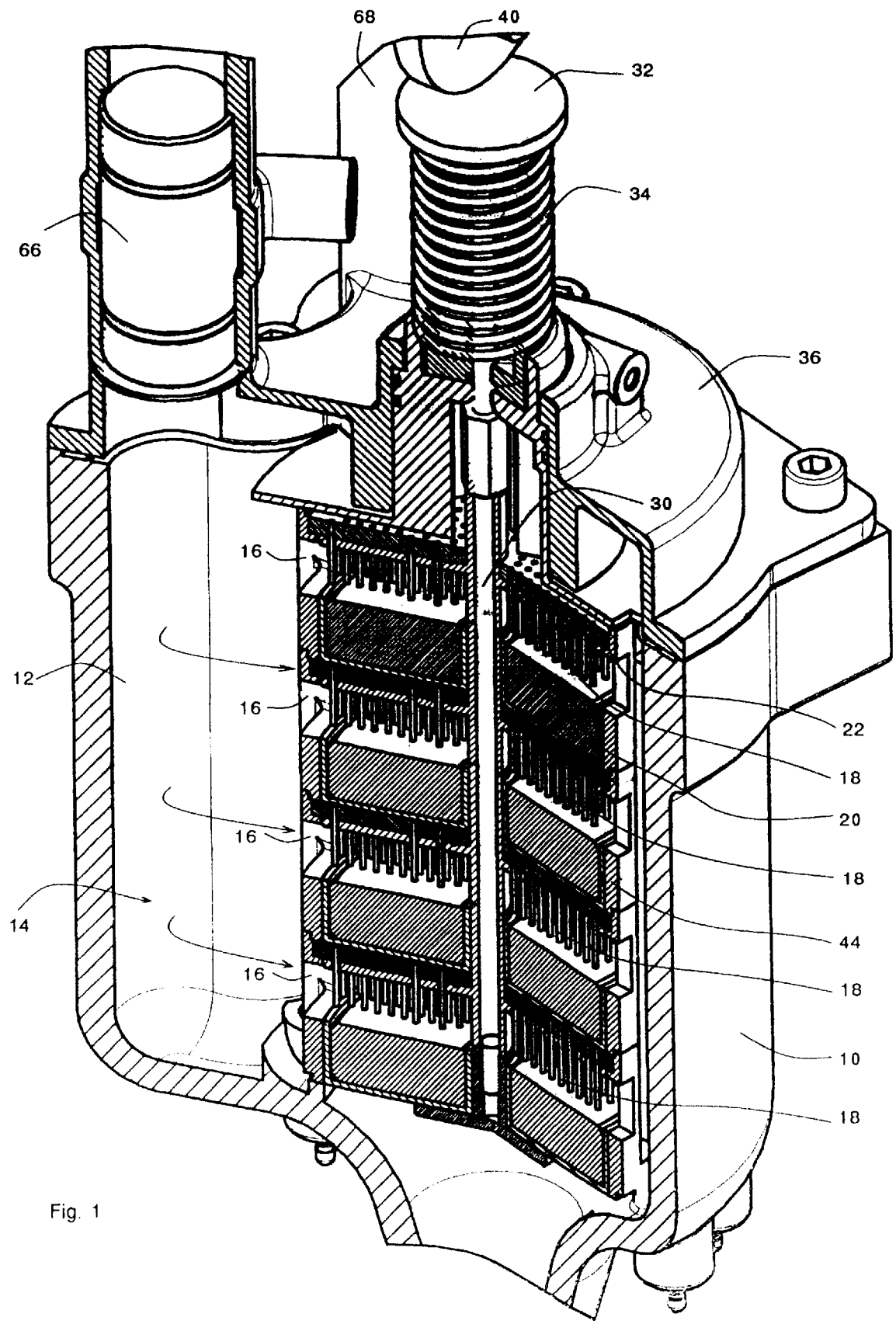
FIG. 1 is a perspective illustration, partly in section, of the apparatus for water treatment with the treatment chamber.
Figure 3:
FIG. 3 is a perspective view of a cathode to be mounted in the treatment chamber.
Figure 5:
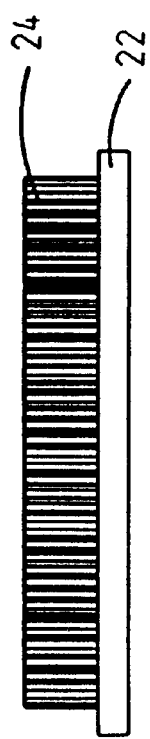
FIG. 5 shows a side elevation of a cathode to be mounted in the treatment chamber.
Figure 4:
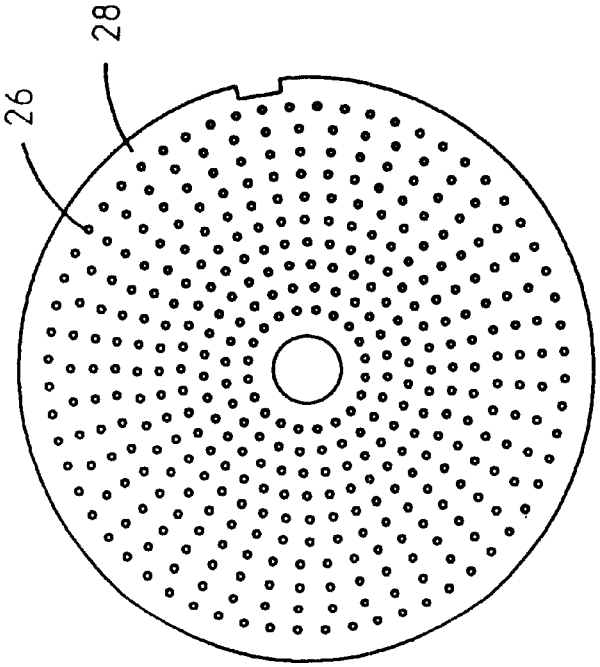
FIG. 4 shows a perforated disc provided in the treatment chamber for stripping seed crystals from the cathode.

Referring to FIG. 1, numeral 10 designates an apparatus for water treatment. The apparatus 10 has an inlet 12, which communicates with a treatment chamber 14 through apertures 16. A plurality of dynamic water treatment units 18 are mounted in the treatment chamber coaxial one on top of the other. Each water treatment unit 18 consists of an anode 20 and a cathode 22. The cathode consists of an annular disc with a plurality of parallel, axially extending pins 24. This is shown separately in FIG. 3, FIG. 4 and FIG. 5. The pins 24 extend through correspondingly arranged holes 26 of a perforated disc 28. The perforated discs 28 of all water treatment units 18 are interconnected and are connected with a push rod 30. The push rot ends in a disc 32. The disc 32 is engaged by a compression spring 34 in the form of a helical spring. The compression spring 34 abuts a base plate 36 of a fitting part (not shown) to which the present apparatus is to be attached. The base plate 36 forms the cover of the treatment chamber 14. The push rod 30 can be moved downwards, as viewed in FIG. 1, by means of a cam 40 against the action of the compression spring 34. During this movement, the perforated discs 28 slide on the pins 24 and separate seed crystals therefrom, which have been formed on the cathode 22 due to an inhomogeneous electric field acting between cathode 22 and anode 20. These seed crystals are taken along by the water flow.

Figure 2:
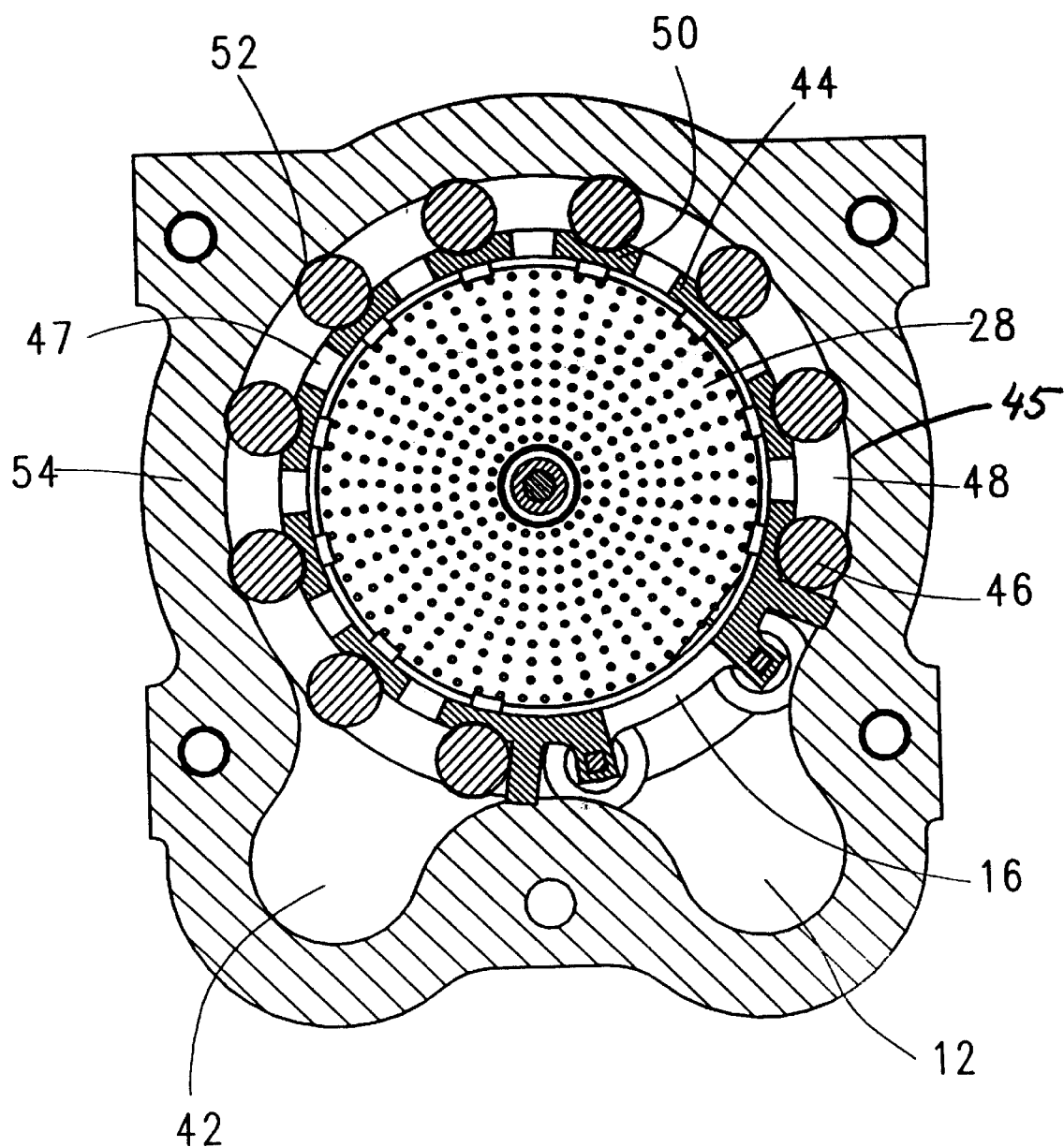
FIG. 2 is a cross-sectional view of the apparatus for water treatment.

On its path from the inlet 12 to an outlet 42 shown in FIG. 2, the water flow flows substantially transverse to the pins and between the pins through the field between cathode 22 and anode 20. This results in a rather long path through the inhomogeneous electric field and, thereby, in a rather long dwell time in this field. Furthermore, the pressure drop between inlet 12 and outlet 42 of the treatment chamber 14 is small.

The cam 40 is mounted on a shaft of an electric servo or drive motor (not shown). The perforated discs 28 are cyclically moved downwards by the servo or drive motor through the cam 40 and the push rod 30 (FIG. 1).

Figure 8:
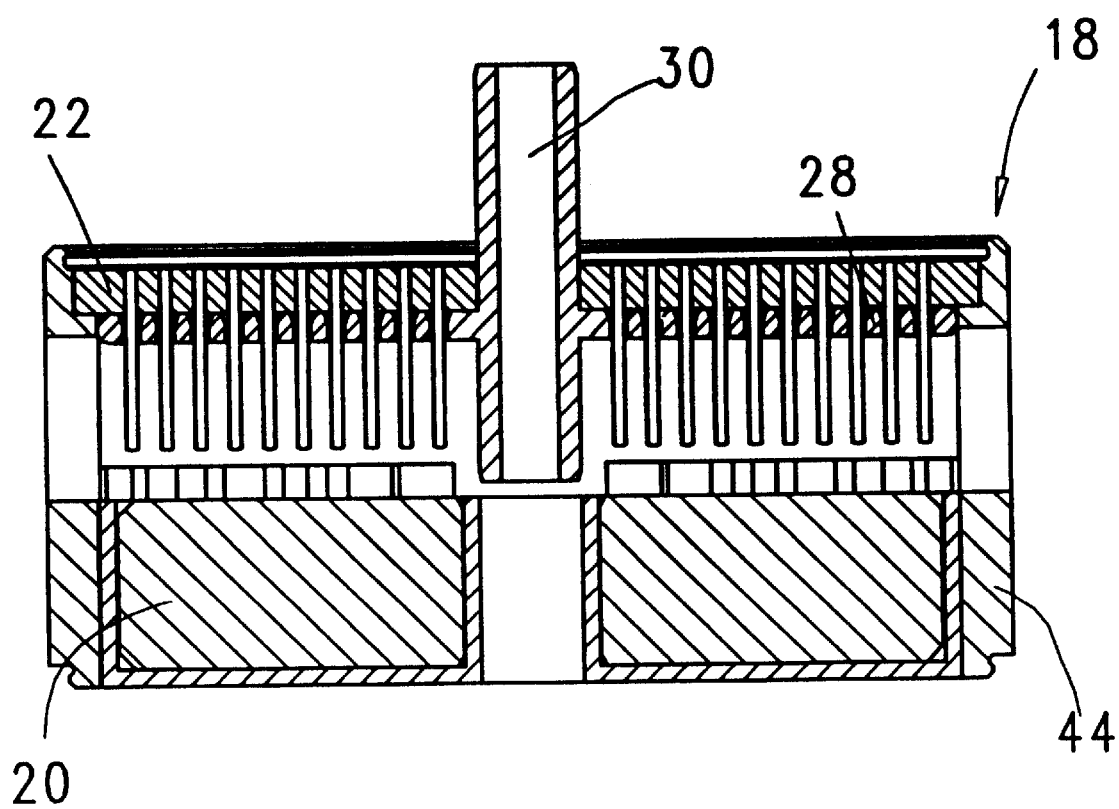
FIG. 8 is a longitudinal, sectional view of a treatment chamber module.

As illustrated in FIG. 2 and FIG. 8, a water treatment unit 18 is limited by a wall 44 of plastics. The wall 44 is a partition between the treatment chamber and an aftertreatment chamber 45 extending around the treatment chamber. The aftertreatment chamber is subdivided into a plurality of partial chambers 48 by cylindrical graphite electrodes 46. In the present embodiment, the aftertreatment chamber 45 consists of nine partial chambers 48. Communication between the treatment chamber and the partial chambers 48 of the aftertreatment chamber is established through apertures 47. The electrodes are loosely retained in trough-shaped cavities 50 and 52 which are provided on opposite sides in the partition and in an outer wall 54. The outer wall 54 is a limiting wall of the aftertreatment chamber 45. The electrodes 46 are firmly held in position and cannot be displaced. Therefore, the electrodes require no additional attachment. Therefore, they can easily be exchanged.

The electrodes have alternately positive and negative polarity. Thereby, a not particularly inhomogeneous field is generated the lines of flux of which are normal to the electrodes and extend substantially parallel to the partition 44. In this field, the water with the seed crystals is exposed to an aftertreatment. In order to prevent seed crystals from being deposited after a certain time on the electrodes 46, the polarity is reversed in short time intervals. Thus, each electrode represents once an anode and once a cathode.

Figure 6:
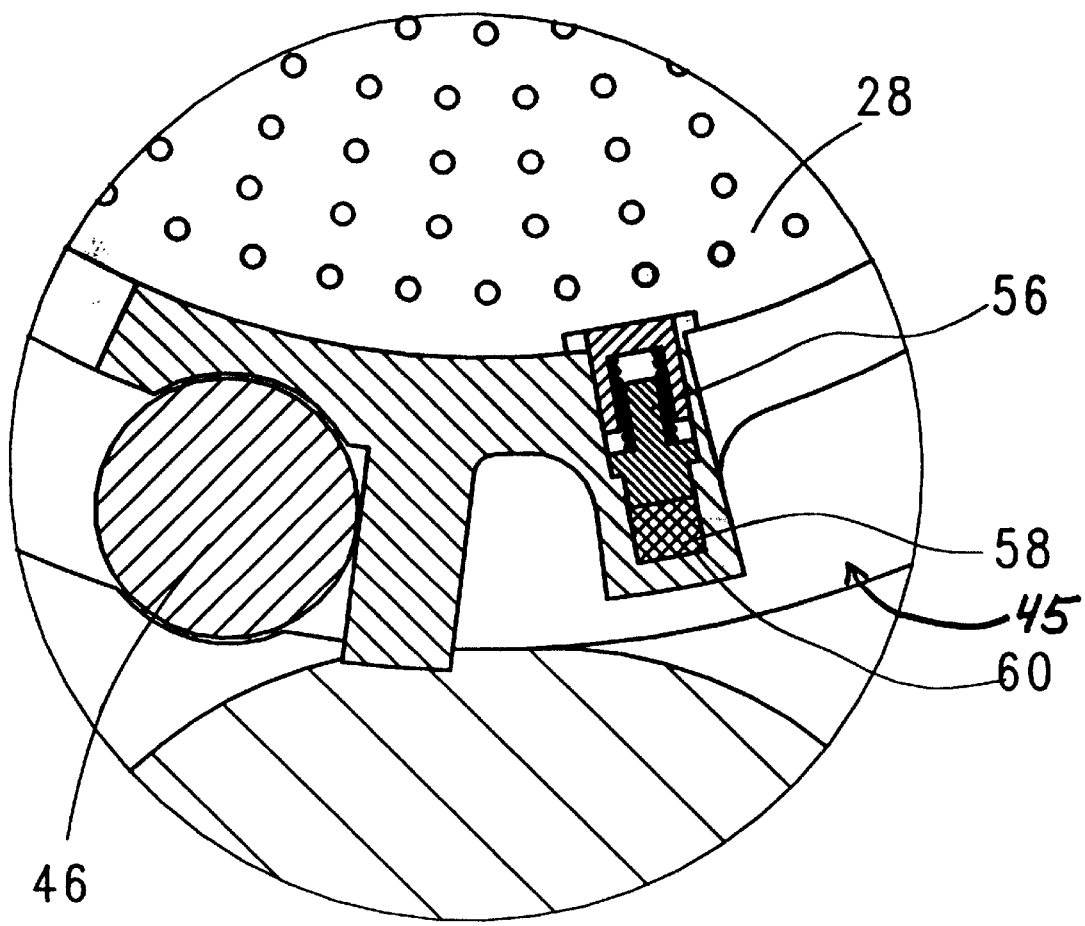
FIG. 6 illustrates the contacting of the electrodes in the treatment chamber.
Figure 7:
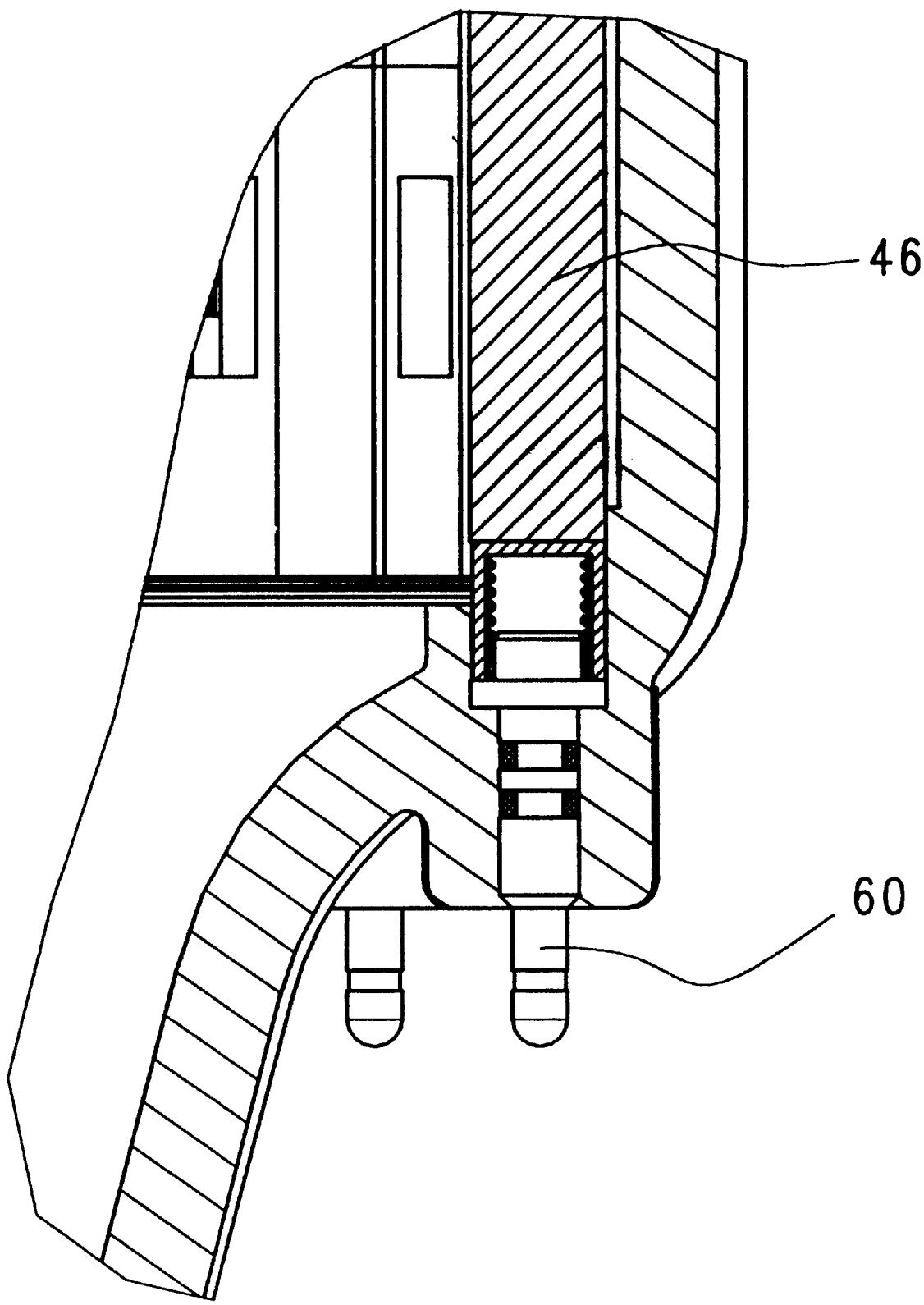
FIG. 7 illustrates the contacting of the electrodes in the aftertreatment chamber.

The contacting of the electrodes is illustrated in FIG. 6 and FIG. 7.

Referring to FIG. 6, a voltage is applied to a contact rod 58 of rectangular cross section, which is retained in a correspondingly rectangular recess 60 of partition 44. The contact rod 58 and recess extends axially along the whole length of the insulating plastics partition along all of the water treatment units 18 (FIG. 1). Adjacent each cathode 22 of the water treatment units 18, the partition 44 has a radial, stepped bore opening into the rectangular recess. A conductive contact piece 56 is placed in this stepped bore and engages the contact rod 58. The contact piece 56 has a base, contacting the contact rod, a radial flange and a reduced diameter central projection facing cathode 22. A conductive thrust piece is guided in the larger diameter cathode-side portion of the bore. A helical compression spring surrounding the central projection of the contact piece 56 abuts the flange of the contact piece 56 and urges the thrust piece into engagement with the cathode 22.

Quite similar is the contacting of the electrodes 46, as illustrated in FIG.7.

The insulating outer wall 54 of the apparatus has stepped bores in alignment with the cylinder defined by the two trough-shaped cavities 50 and 52 and, thereby, with the electrodes 46. A conductive contact piece 60 is mounted in each of these stepped bores. The contact piece has a base with an axial projection extending out of the bore, a flange engaging the shoulder between the inner, larger-diameter portion of the stepped bore and the outer, smaller-diameter portion, and a smaller-diameter inner projection. A pot-shaped, conductive thrust piece extends over this inner projection. A helical spring surrounds the inner projection and urges the thrust piece into engagement with the end face of the cylindrical electrode 46. A voltage can be applied to the outer projection.

The apparatus described operates as follows:

Water from the water supply pipe flows through the tube socket 66 to the inlet 12 of the treatment chamber 14. The inlet 12 is represented by a conduit extending vertical as viewed in FIG. 1. Water enters one of the water treatment units through an aperture 16. The water flows through the water treatment units, seed crystals being formed on the cathodes 22. Then the water flows through the apertures 47 into the partial chambers 48 of the aftertreatment chamber. There, it flows in vertical direction (FIG. 1) and is exposed to the electric field which is generated by the electrodes 46. This causes the seed crystals formed in the treatment chambers to grow, whereby the contents of solved carbonate in the water is reduced.

The water leaves the partial chambers 48 of the aftertreatment chamber at their upper ends—as viewed in FIG. 1—and get to the outlet 42, which communicates with a tubular socket 68. This tubular socket 68 establishers communication with the water supply.

I claim:

1. An apparatus for treating water by means of an electric field, comprising a water treatment chamber having inlet and outlet means for insertion into water conduit means to permit, when so inserted, water flow through said chamber; a cathode having a cathode surface, said cathode being arranged in said water treatment chamber such that said water flow flows over said cathode surface; an anode; means for permitting a voltage to be applied between said anode and said cathode to generate an electric field between said anode and said cathode, whereby seed crystals of minerals contained in said water are deposited on said cathode surface; and means for removing said seed crystals from said cathode surface to permit these seed crystals to be carried along with the water; and further comprising an aftertreatment chamber; anode and cathode means mounted in said aftertreatment chamber; means for permitting an electric voltage to be applied to said anode and cathode means of said aftertreatment chamber to generate an electric field in said aftertreatment chamber; and means for directing water from said treatment chamber through said aftertreatment chamber in such a way that the dwell time of the water in said aftertreatment chamber is longer than the dwell time of the water in said treatment chamber.

2. An apparatus as claimed in claim 1, wherein said cathode means of said treatment chamber comprise a plurality of parallel pins mounted on a support, and said removing means comprise a perforated disc having holes therein, said pins extending through said holes; and further comprising means for moving said perforated disc over the length of said pins of said cathode.

3. An apparatus as claimed in claim 2 and further comprising an electric motor for moving said perforated disc.

4. An apparatus as claimed in claim 2, wherein the structure of said inlet means, said treatment chamber, said aftertreatment chamber and said outlet means defines a direction of flow of the water through said treatment chamber, said direction of flow being transverse to said pins.

5. An apparatus as claimed in claim 1, wherein a plurality of treatment chambers are connected in parallel.

6. An apparatus as claimed in claim 1, wherein said aftertreatment chamber surrounds said treatment chamber, said aftertreatment chamber and said treatment chamber being separated by a circumferential partition, said aftertreatment chamber communicating with said treatment chamber through apertures in said circumferential partition.

7. An apparatus as claimed in claim 6 and further comprising radial partition means for subdividing said aftertreatment chamber into a plurality of partial chambers, each of said apertures in said circumferential partition opening into a respective one of said partial chambers.

8. An apparatus as claimed in claim 7 wherein said radial partitions are electrodes for generating said electric field in said aftertreatment chamber.

9. An apparatus as claimed in claim 8, wherein said radial partitions are graphite rods.

10. An apparatus as claimed in claim 9, wherein said graphite rod electrodes have end faces, said end faces being contacted by means of spring loaded, conductive thrust pieces urged into engagement with said end faces and electrically connected to contact pieces which, in turn, are connected with said means for permitting electric voltage to be applied.

11. A device as claimed in claim 9, wherein said circumferential partition has trough-shaped cavities on its outside, and said aftertreatment chamber is defined outwardly by an outer wall, said outer wall having also trough-shaped cavities adjacent said cavities of said circumferential partition, said cavities extending over the whole length of said graphite rod electrodes, said graphite rod electrodes being retained in said cavities.

12. An apparatus as claimed in claim 8, wherein the polarities of said electrodes is alternately positive and negative.

13. An apparatus as claimed in claim 12, and further comprising means for reversing the polarity of the electrodes after selected time intervals.

14. An apparatus as claimed in claim 7, wherein a plurality of treatment chambers are arranged module-like one on top of the other.

15. An apparatus as claimed in claim 14, wherein each of said treatment chambers communicates with said inlet means, and said partial chambers of said subdivided aftertreatment chamber extend along the whole length of all treatment chambers, all of said partial chambers opening, at one end, into said outlet means.

16. An apparatus as claimed in claim 1, wherein a plurality of treatment chambers are connected in series.

17. A method for electro-physical water treatment of drinking water, comprising the steps of exposing said drinking water to an electric field in a treatment chamber during a first dwell time, and aftertreating said exposed drinking water by exposing it to another electric field during a second dwell time longer than said first dwell time.

\* \* \* \* \*